United States Patent

[11] 3,547,284

[72] Inventor Glenn G. Dunbar,
2608 Overbrook Drive, Toledo, Ohio 43614
[21] Appl. No. 859,695
[22] Filed Sept. 22, 1969
Continuation-in-part of Ser. No. 633,200, Apr. 24, 1967, abandoned.
[45] Patented Dec. 15, 1970

[54] VEHICLE MOUNTED LOADING HOIST
6 Claims, 11 Drawing Figs.
[52] U.S. Cl. ................................................ 214/77,
104/32, 104/248, 105/178, 105/218, 295/37
[51] Int. Cl. ........................................................ B60p 1/48
[50] Field of Search.......................................... 214/77—80,
75H; 104/246, 248, 32, 33; 105/178, 218; 295/37

[56] References Cited
UNITED STATES PATENTS
2,216,704 10/1940 Flanagan...................... 105/178X
2,273,705 2/1942 Guerrero...................... 104/248
2,857,062 10/1958 Anderson...................... 214/75(H)
3,292,559 12/1966 Cousins et al................. 105/178X Primary Examiner—Gerald M. Forlenza
Assistant Examiner—Robert J. Spar
Attorney—Owen & Owen ABSTRACT: This invention is a vehicle mounted loading hoist for use with a vehicle having a pair of parallel rails positioned on its bed. A carriage is mounted for movement on the rails and a loading hoist is positioned on the carriage. The carriage includes a pair of axle boxes. Each axle box includes a pair of sidewalls having a lower shoe part adapted to extend beneath a rail flange. First adjusting mechanism varies the elevation of the shoe parts. Second adjusting mechanism varies the length of the carriage axles and third adjusting mechanism adjusts the spacing between adjacent axle box sidewalls. A motor is provided to selectively move the carriage along the rails.

3,547,284
PATENTED DEC 15 1970
SHEET 1 OF 3
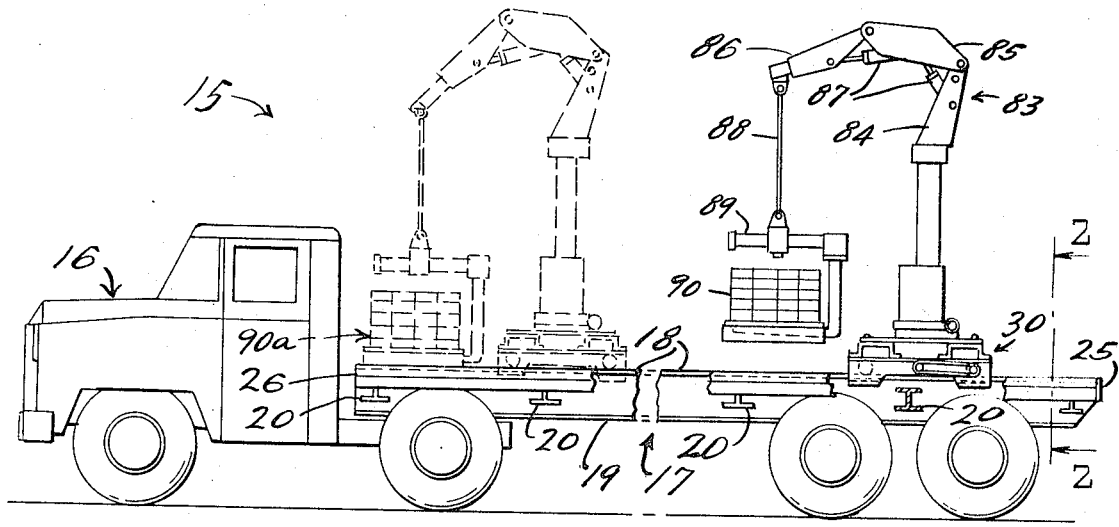
FIG-1-
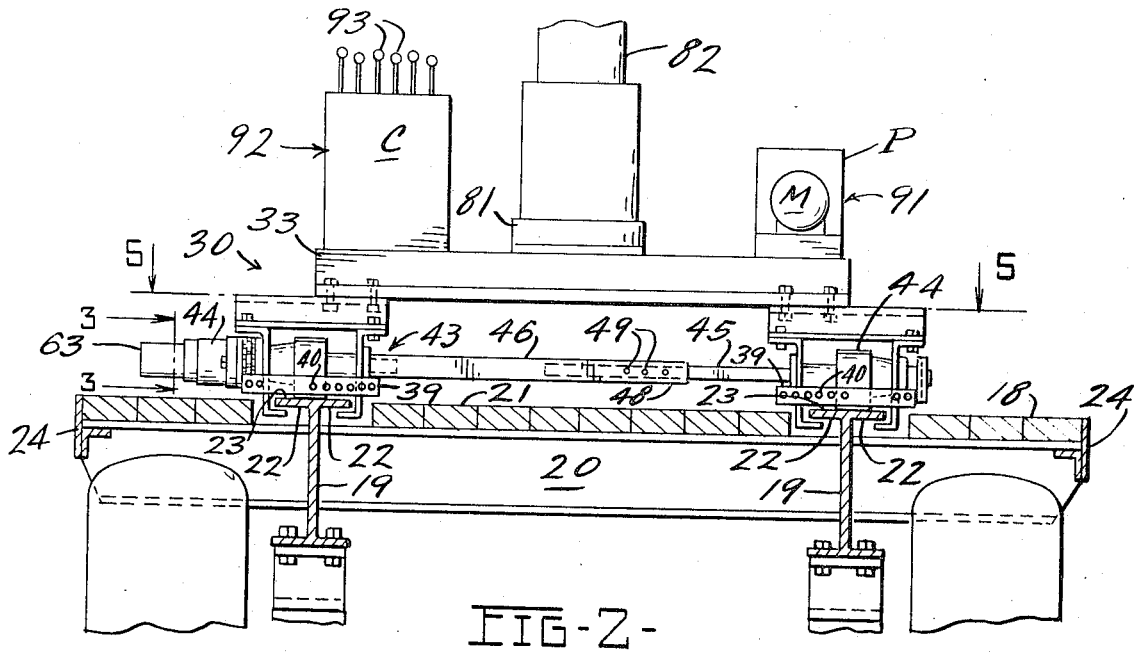
FIG-2-
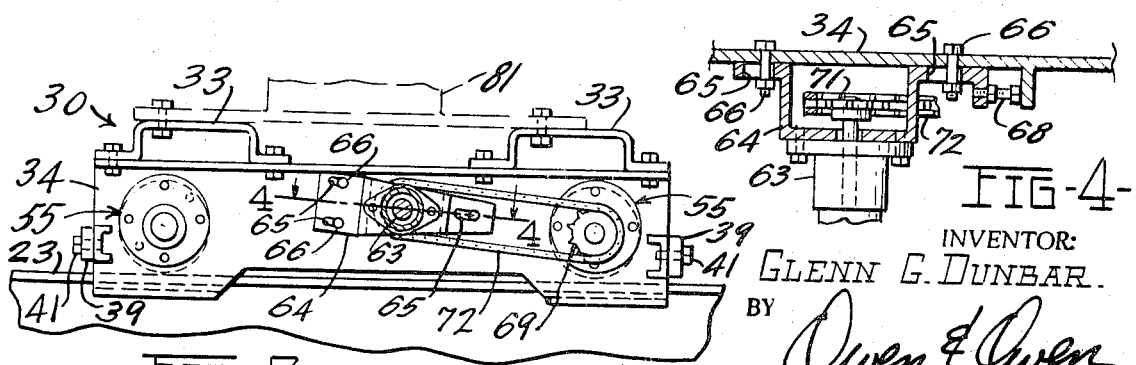
FIG-3-    FIG-4-
INVENTOR:
GLENN G. DUNBAR
BY
Owen & Owen
ATT'YS.

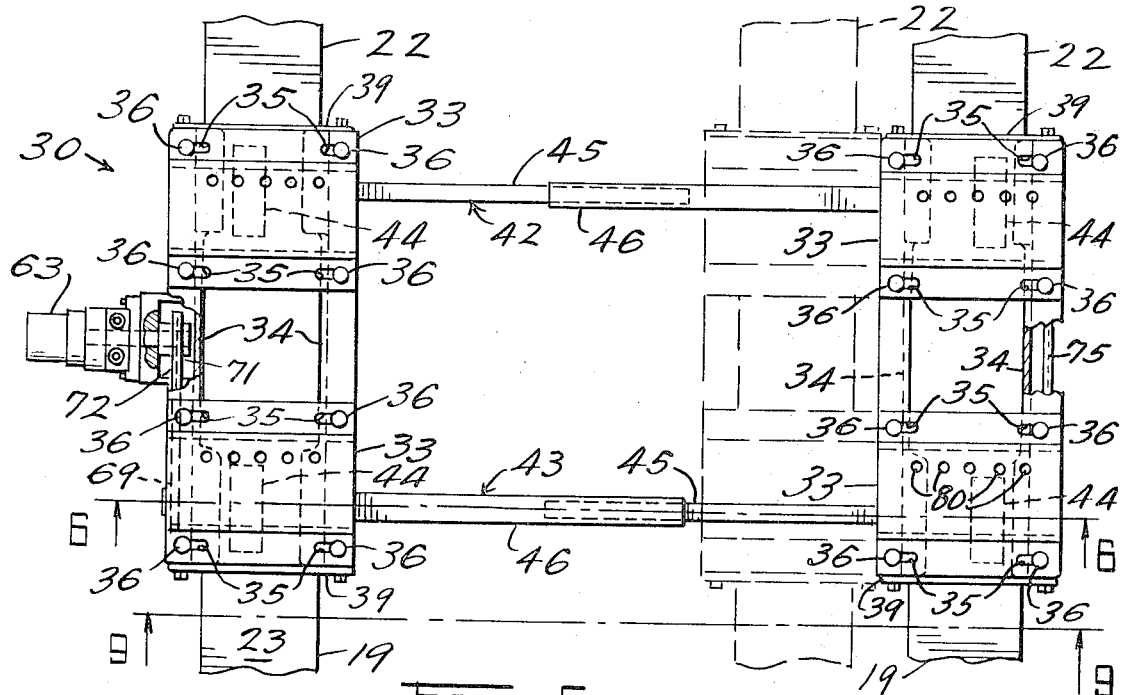
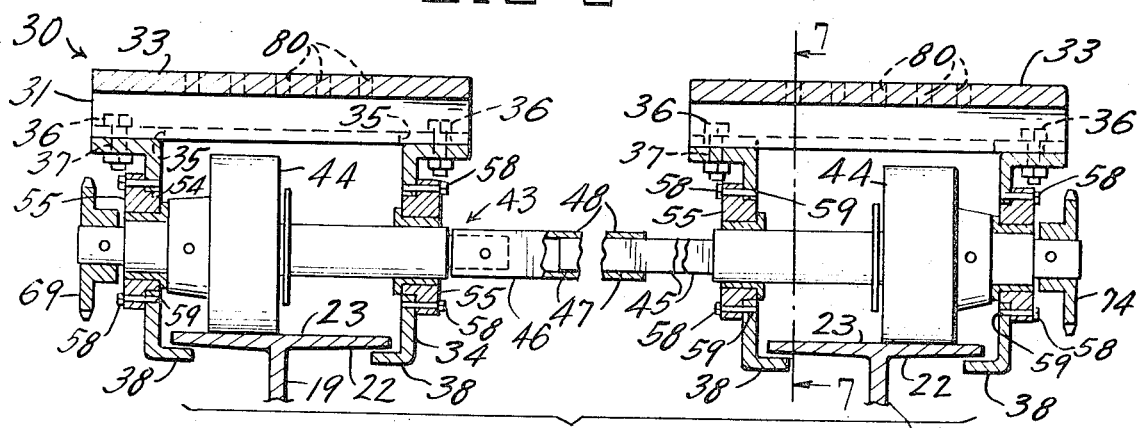
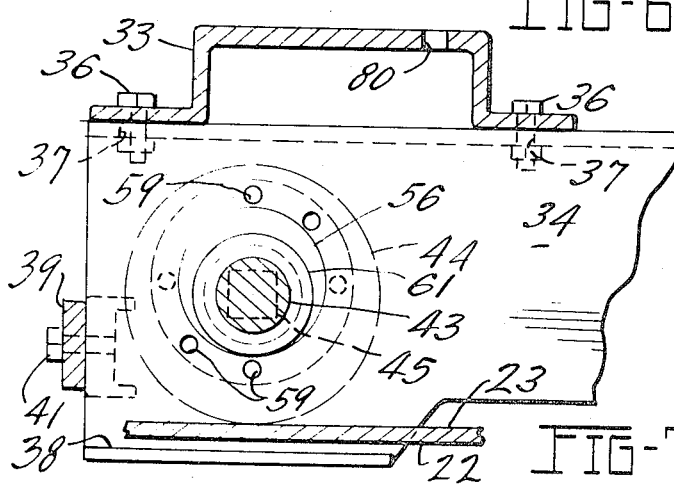

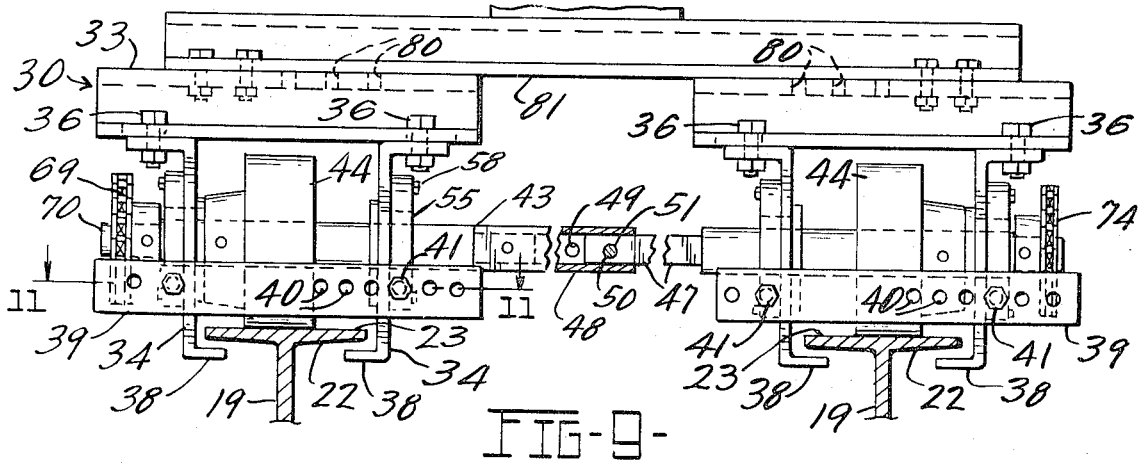
FIG-9-
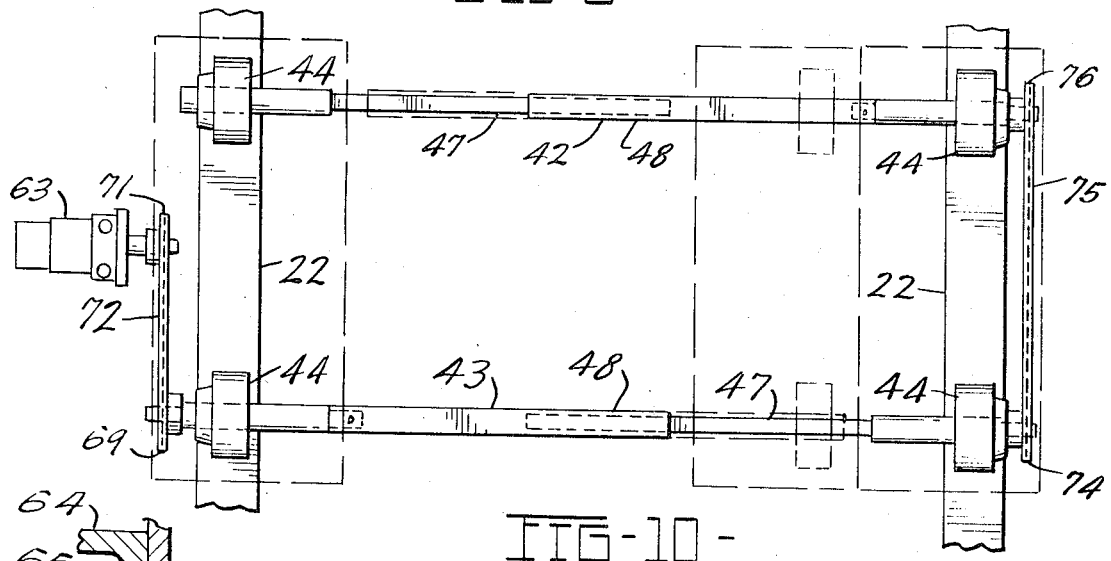
FIG-10-
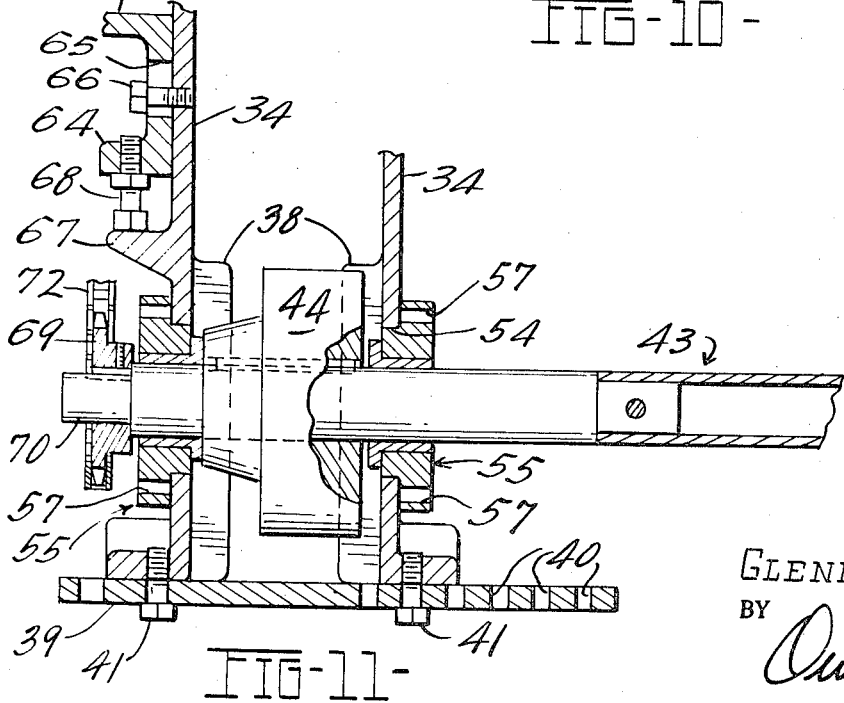
FIG-11-
INVENTOR:
GLENN G. DUNBAR.
BY
Owen & Owen
ATT'YS.

3,547,284

VEHICLE MOUNTED LOADING HOIST

CROSS-REFERENCE TO RELATED APPLICATION

This application is a continuation-in-part of copending application Serial No. 633,200, filed Apr. 24, 1967 now abandoned.

BACKGROUND OF THE INVENTION

The present invention relates to a vehicle mounted loading hoist which is adaptable for use on vehicles having a load carrying bed. A pair of parallel longitudinally extending rails are spaced inwardly from the side edges of the bed. A loading hoist or hoisting means is mounted for movement along the rails.

The rails are spaced inwardly from the side edges of the beds and are spaced from each other a predetermined distance. This distance often varies depending upon, for example, the design loading of the hoisting mechanism. Often, the upper flange of the rail varies in size and also the upper surface of the rail often varies from vehicle to vehicle with respect to its vertical elevation.

It has been found that often prior art apparatus cannot easily adapt to variances in vehicle construction, more particularly in bed and rail construction.

SUMMARY OF THE INVENTION

The present invention is a vehicle mounted loading hoist for use with a vehicle having a load carrying bed which includes a pair of parallel, longitudinally extending, rails spaced inwardly from the side edges of the bed. The rails are spaced from each other a predetermined distance and each of the rails includes an upper flange having an upper surface located at a predetermined elevation. The loading hoist includes carriage means mounted for movement along the rails and motor means for moving the carriage. The carriage means also includes a pair of axle boxes, each of the axle boxes positioned adjacent a respective one of the rails. Each axle box has a pair of sidewalls and the sidewalls include lower edge shoe parts adapted to extend beneath a portion of the upper flange of the respective rail. A pair of axles extend between the axle boxes and a plurality of wheels are mounted on the axles adjacent the axle boxes. First adjusting means are provided for varying the vertical elevation of the lower shoe parts. Second adjusting means are provided for adjusting the length of the axles relative to the predetermined distance between the rails and third adjusting means are provided for adjusting the adjacent pairs of sidewalls to conform with the width of the rail flange.

BRIEF DESCRIPTION OF THE DRAWINGS

FIG. 1 is a fragmentary, side elevational view of a vehicle mounted loading hoist according to the present invention and showing in dashed lines an alternative position of the hoisting means;

FIG. 2 is a fragmentary, vertical sectional view taken along the line 2–2 of FIG. 1;

FIG. 3 is a fragmentary, vertical sectional view taken along the line 3–3 of FIG. 2;

FIG. 4 is a fragmentary, sectional view taken along the line 4–4 of FIG. 3;

FIG. 5 is a fragmentary plan view taken along the line 5–5 of FIG. 2 and showing by dashed lines an alternate position of an axle box;

FIG. 6 is a fragmentary, vertical sectional view taken along the line 6–6 of FIG. 5;

FIG. 7 is a fragmentary, vertical sectional view taken along the line 7–7 of FIG. 6 and drawn on an enlarged scale;

FIG. 8 is an exploded view of an axle plate and axle bearing assembly;

FIG. 9 is a vertical sectional view, similar to FIG. 6, and taken along the line 9–9 of FIG. 5;

FIG. 10 is a fragmentary plan view, showing in particular the parallel axle boxes and the axle assemblies; and FIG. 11 is a fragmentary, horizontal sectional view taken along the line 11–11 of FIG. 9.

DESCRIPTION OF THE PREFERRED EMBODIMENT

A vehicle mounted loading hoist according to the present invention is generally indicated by the reference number 15. The vehicle mounted loading hoist 15 includes a tractor 16 and a trailer 17. The trailer 17 has a load carrying bed 18.

Referring to FIGS. 1 and 2, the trailer 17 includes a pair of longitudinally extending I-beams 19 and a plurality of laterally braced girders 20 which intersect and are welded to the I-beams 19. Wood planking 21 is positioned on the girders 20 and forms the upper surface of the bed 18.

The I-beams 19 have upper flanges 22 which serve as rails, as will be described in detail below. The flanges or rails 22 have upper surfaces 23. The rails 22 are positioned inwardly from side edges 24 of the bed 18 a predetermined distance. In the present embodiment, the rails 22 are spaced inwardly from the side edges 24 a distance equal to approximately one-fifth of the total width of the bed 18. The bed 18 has a rear end 25 and front end 26 and the rails 22 extend from the rear end 25 to the front end 26. Stops are provided at the ends 25 and 26 adjacent the rails 22.

A movable truck or carriage 30 is mounted for movement along the rails 22. Referring to FIGS. 5 and 6, the carriage 30 includes a pair of axle boxes 31 and 32. Each of the axle boxes 31 and 32 includes upper support members 33 and depending sidewalls 34. Referring to FIG. 5, each of the upper support members 33 has four elongated slots 35. The longitudinal axis of the slots 35 extend perpendicular to the longitudinal axes of the rails 22. Bolts 36 (see also FIG. 7) extend through the slots 35, and through holes 37 in the sidewalls 34. The bolts 36 connect the depending sidewalls 34 to the respective upper support members 33. The slots 35 enable the spacing between adjacent ones of the sidewalls 34 to be adjusted. Referring to FIG. 6, each of the depending sidewalls 34 includes a lower shoe 38 which is adapted to extend beneath the upper flange 22. To adjust the position of adjacent sidewalls 34 so that the respective shoes 38 extend inwardly beneath the flange 22, the bolts 36 are loosened and the elongated slots 35 enable the sidewalls 34 to be adjusted.

Preferably a reinforcing member 39 (see FIG. 9) extends between adjacent ones of the sidewalls 34 to secure the lower edges of the sidewall 34 in a stable position. The reinforcing member 39 has a series of longitudinally spaced holes 40. Bolts 41 are positioned in respective ones of the holes 40 to secure the lower end of the sidewalls 34.

Referring to FIGS. 5 and 6, a pair of axles 42 and 43 extend between the axle boxes 31 and 32. A plurality of wheels 44 are mounted adjacent the outer ends of the axles 42 and 43. The wheels 44 are adapted to travel on the upper surface 23 of the rails 22. Each of the axles 42 and 43 has a first section 45 and a second section 46. The first section 45 has a narrowed end 47 which in the present embodiment is rectangular in configuration. The second section 46 has a telescoping end section 48 which receives the narrowed end 47. Referring to FiG. 2, the telescoping end section 48 defines a plurality of longitudinally spaced openings 49. A retaining pin 50 (see FIG. 9) extends through a respective one of the openings 49 and through a hole 51 in the narrowed end 47 of the first section 45 to secure the sections 45 and 46 in a connected relationship. To adjust the length of one of the axles 42 or 43, the pin 50 is removed and the telescoping end section 48 is moved with respect to the narrowed end 47 until the length of the axle 42 or 43 is at its correct length. At this position, one of the openings 49 is aligned with the hole 51 and the locking pin 50 is reinserted to removably secure the axle 42 or 43.

The sidewalls 34 have aligned openings 54 which receive axle plates 55. In the present embodiment, referring to FIG. 8, each of the axle plates 55 includes a concentric hub 56 which extends at least partially through one of the openings 54 in one of the sidewalls 34. Four openings 57 are equally spaced around the periphery of the axle plate 55. Removable bolts 58 extend through the openings 57 to connect the axle plate 55 to the sidewall 34. The sidewall 34 defines eight equally spaced openings 59 which are aligned with the openings 57. Referring to FIG. 8, an eccentric axle opening 60 extends through the hub 56. A bearing 61 is inserted in the eccentric axle opening 60 and the bearing 61 receives the axle 42 or 43. By rotating the axle plate 55, the vertical elevation of the eccentric axle opening 60 is varied and, of course, the vertical elevation of the axle 42 or 43 relative to its respective shoe 38 is varied. To rotate the axle plate 55 the bolts 58 are removed and the axle plate 55 rotated to its proper position. At this time, the openings 57 are aligned with four of the sidewall openings 59 and the bolts 58 reinserted.

Movement of the carriage 30 along the rails 22 is produced and controlled by a motor 63 (see FIG. 10). Preferably the motor 63 is fluid driven and is connected to one of the sidewalls 34 by an adjustable motor mount bracket 64. A series of slots are provided in the bracket 64 (see FIG. 3). Bolts 66 extend through the slots 65 to secure the bracket to the sidewall 34. Referring to FIG. 11, preferably stop 67 extends outwardly from the sidewall 34. An adjusting screw 68 is positioned between the stop 67 and the bracket 64.

A sprocket 69 is attached to an axle spindle 70 which is a component of the axle 43. The motor 63 drives a motor sprocket 71 and a chain 72 extends between the motor sprocket 71 and the axle sprocket 69. Referring to FIG. 10, an axle sprocket 74 is mounted on the other end of the axle 43 and mounts a chain 75. The chain 75 travels around an axle sprocket 76 which is mounted on one end of the axle 42 and drives the axle 42 and its respective wheels 44. Therefore, in this embodiment, the motor 63 is operatively connected to each of the wheels 44 to drive the wheels 44 along the parallel rails 22.

Referring to FIG. 1, a hoist 79 is mounted on the carriage 30. Referring to FIGS. 5 and 6, the upper support members 33 of the axle boxes 31 and 32 define a plurality of holes 80. The hoist 79 includes a base 81. A mast 82 extends vertically upwardly from the base 81 and supports a movable boom 83. In the present embodiment, the boom 83 has several articulated sections 84, 85 and 86. The boom 83 rotates relative to the mast 82. Movement of the boom sections 84, 85 and 86 is controlled by hydraulic cylinders 87. A rack and pinion drive assembly (not shown) controls the rotative movement between the mast 82 and the boom 83. A cable 88 is connected to the boom 83 and mounts a load engager 89 at its lowermost end. The load engager 89, shown in the drawings, is preferably of the kind and structure shown in my U.S. Letters Pat. No. 3,239,072.

In FIG. 1, the load engager 89 is shown moving a pallet of bricks 90 from a position adjacent the rear end 25 of the bed 18 to a dashed line position 90 adjacent the front end 26.

When the boom 83 is rotated and the load, for example, the pallet of bricks 90, has its center of gravity at a point exterior of the bed 18. The shoes 38 of the sidewalls 34 of the axle boxes 31 and 32 serve as safety devices to prevent the truck or carriage 30 from becoming disengaged from the rails 22. For example, referring to FIG. 6, if the operator misjudges the load and the axle box 32 begins to rotate upwardly, the shoes 38 engage the underside of the rails 22 and prevent further rotative movement.

Referring to FIG. 2, a motor and pump assembly 91 is mounted on the base 81. The motor and pump assembly supplies hydraulic fluid to, for examples, the hydraulic motor 63 which drives the carriage 30, the hydraulic boom cylinders 87, the cylinders for the boom rack and pinion drive, and to the cylinders which operate the load engager 89.

An operating console 92 is also mounted on the base 81. The console includes a plurality of operating levers 93 which are operatively connected to, for examples, the motor 63 and the boom cylinders 87.

It has been found that the vehicle mounted loading hoist 15, according to the present invention, provides an improved apparatus for the loading, unloading and transporting of many types of objects.

I claim:

1. A vehicle mounted loading hoist for use with a vehicle having a load carrying bed, such bed having a pair of parallel, longitudinally extending, rails spaced inwardly from the side edges of the bed, the rails being spaced from each other a predetermined distance, each of the rails including an upper flange having an upper surface located at a predetermined elevation, said loading hoist comprising, in combination, carriage means mounted for movement on said rails, said carriage means including a pair of axle boxes, each of said axle boxes being positioned adjacent a respective one of such rails and having a pair of sidewalls, said sidewalls including a lower shoe adapted to extend beneath a portion of the upper flange of the respective rail, a pair of axles extending between said axle boxes, a plurality of wheels mounted on said axles and adapted to engage the upper surface of said rails, first adjusting means for varying the vertical elevation of said lower shoe parts, second adjusting means for adjusting the length of said axles relative to the predetermined distance between said rails, third adjusting means for adjusting said pair of sidewalls to conform with the width of said rail flange, motor means for moving said carriage along said rails, and hoisting means mounted on said carriage.

2. A vehicle mounted loading hoist according to claim 1, wherein said hoisting means includes a base, a mast on said base, a movable boom supported on said mast, a cable connected to said boom, a load engager connected to said cable, and actuatable power responsive means operatively connected to said boom for moving said boom and said cable to control movement of said load engager.

3. A vehicle mounted loading hoist, according to claim 2, wherein said first adjusting means for varying the vertical elevation of said lower shoe comprises an axle plate mounted on each of said sidewalls, said axle plate defining an eccentric axle opening therethrough, such eccentric axle opening receiving one of said axles and means for connecting said axle plate to said sidewall in various relative rotative positions to vary the relative vertical elevations of said axle and said lower shoe.

4. A vehicle mounted loading hoist, according to claim 2, wherein each of said axles has a first section and a second section, said second adjusting means for adjusting the length of said axles relative to the predetermined distance between said rails comprising a narrowed end on said first section and a telescoping end on said second section, said telescoping end being effective to receive said narrowed end, and means for removably connecting said narrowed end to said telescoping end.

5. A vehicle mounted loading hoist, according to claim 4, wherein said connecting means comprises a plurality of longitudinally spaced openings defined in said telescoping end, at least one hole defined in said narrowed end, and a retaining pin positioned through one of said openings and said hole.

6. A vehicle mounted loading hoist, according to claim 2, wherein each of said axle boxes includes upper support members and wherein said third adjusting means for adjusting said pair of sidewalls comprises elongated slots defined in said support members adjacent each of said sidewalls and a plurality of bolts extending through said slots and through cooperating openings defined in said sidewalls.